(12) United States Patent
Holley

(10) Patent No.: US 7,436,641 B2
(45) Date of Patent: Oct. 14, 2008

(54) DEVICE AND SYSTEM FOR WIRELESS COMMUNICATIONS WITH A CIRCUIT BREAKER

(75) Inventor: Robert D. Holley, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 438 days.

(21) Appl. No.: 10/973,760

(22) Filed: Oct. 26, 2004

(65) Prior Publication Data

US 2006/0087783 A1 Apr. 27, 2006

(51) Int. Cl.
*H02H 3/00* (2006.01)
(52) U.S. Cl. .......................................... 361/81; 361/64
(58) Field of Classification Search ................... 361/62, 361/64, 42–50, 115, 81; 702/60, 62
See application file for complete search history.

(56) References Cited

U.S. PATENT DOCUMENTS

| 4,556,882 A | 12/1985 | Brifman et al. |
|---|---|---|
| 5,162,664 A | 11/1992 | Haun et al. |
| 5,875,087 A * | 2/1999 | Spencer et al. ................. 361/87 |
| 6,212,049 B1 | 4/2001 | Spencer et al. |
| 6,868,349 B2 * | 3/2005 | Fletcher et al. ............... 702/62 |
| 7,068,045 B2 * | 6/2006 | Zuercher et al. ............ 324/536 |
| 2002/0181174 A1 | 12/2002 | Bilac et al. |
| 2004/0008949 A1 * | 1/2004 | Liu et al. ...................... 385/77 |

FOREIGN PATENT DOCUMENTS

WO    WO 93/23760    11/1993

* cited by examiner

*Primary Examiner*—Michael J Sherry
*Assistant Examiner*—Danny Nguyen
(74) *Attorney, Agent, or Firm*—Hope Baldauff Hartman, LLC

(57) ABSTRACT

A device and system for the wireless communication with a circuit breaker is provided which allows for obtaining data associated with a circuit breaker to quickly and easily access information associated with the trip event. The circuit breaker contains an electronic module which is configured to record and transmit data associated with the circuit using wireless technology.

16 Claims, 3 Drawing Sheets

DEVICE AND SYSTEM FOR WIRELESS COMMUNICATIONS WITH A CIRCUIT BREAKER

BACKGROUND OF THE INVENTION

This invention relates to a device and system for wireless communications with a circuit breaker, and more particularly, to a device and system that provides for the wireless communication of data from a circuit breaker which allows a user to determine the type and location of a fault.

Development of new "smart" circuit breakers will provide a significant increase in the level of protection over existing thermal circuit breakers. Recently, there has been increased interest in the development of the "smart" circuit breakers for use on aircraft and other vehicles.

The need for detecting passive failures and interrogating the circuit breaker for trip type and other advanced trouble shooting information without opening the circuit breaker panel and when still powered is very desirable. Most aircraft panels contain placards that instruct the technician to remove power before opening the panel. If a circuit breaker is to be tested or diagnosed in the panel, it must remain powered.

In addition, typically a pilot of an airplane or other vehicle is not interested in knowing the cause of the fault that caused the circuit breaker to trip. All the pilot must know is that the circuit breaker has tripped and to leave the diagnostics to the maintenance technician on the ground.

It may also be advantageous to log in operating parameters for a given circuit breaker circuit. For example, a health monitoring system may be possible whereby a motor load may be tracked. This may include monitoring and recording the inrush and run current and this information may be reported to the maintenance crew during scheduled maintenance. If the current is rising over time, it could indicate bearing wear or some other type of abnormality. For example, an electronic motor that may control the control surfaces of an aircraft could be monitored. This would allow the maintenance crew to perform preventative maintenance before a failure occurs, which could result in the loss of the aircraft.

The type of trip may not be important to the pilot but the maintenance technician needs to know the type of fault. The device will be able to tell the technician if the event that triggered the device was thermal, arc or ground fault or other yet to be determined fault. Future diagnostics may include (but not limited to) arc fault location, ground fault location, health monitoring of the load and the like. A Built-In-Test (BIT) circuit can be incorporated into the circuit breaker to detect and communicate passive failures during maintenance cycles.

Clearly, there is a need for a device and system that can allow for the communication with a "smart" circuit breaker that would allow for the quick determination of the fault type. In addition, there is a need for a "smart" circuit breaker that could be configured to record and report on various vehicle operating parameters that may be used to determine maintenance requirements.

SUMMARY OF THE INVENTION

In one aspect of the invention, a circuit breaker communication system is provided comprising a circuit breaker and a communicator configured to transmit to and receive signals from the circuit breaker. An electronic module associated with the circuit breaker is also provided and the electronic module is configured to record and store data associated with the operation of the circuit breaker. A transmitter is in communication with the electronic module, with the transmitter configured to transmit the data to the communicator. Finally, a receiver is in communication with the electronic module, and the receiver is configured to receive signals from said communicator.

In another aspect of the present invention, a circuit breaker configured to record and transmit various parameters associated with an electrical circuit is provided comprising a circuit breaker housing configured for insertion into a circuit breaker panel. An electronic module associated with the circuit breaker housing and the electronic module is configured to record a predetermined set of parameters associated with the electrical circuit. A transmitter is in communication with the electronic module, and the transmitter is configured to transmit data associated with the electrical circuit.

In yet a further aspect of the invention a circuit breaker communication device configured to receive data from a circuit breaker is provided comprising a housing with a processor board disposed in the housing. A receiver is in communication with the processor board, and receiver is configured to communicate with the circuit breaker.

In a further aspect of the invention a method of wirelessly communicating with a circuit breaker is provided comprising the steps of providing an electronic module in the circuit breaker, where the electronic module is configured to measure and record parameters associated with a circuit. A transmitter in communication with the electronic module is provided, and the transmitter is configured to transmit data associated with the recorded parameters. A communicator is provided, with the communicator in communication with the transmitter to receive and record the recorded parameters.

In yet another aspect of the invention a system for wireless communication with a circuit breaker in an aircraft is provided comprising a housing configured for installation into a circuit breaker panel. An electronic module is disposed in the housing, and the electronic module is configured to measure and record a predetermined set of parameters associated with an electrical circuit. A transmitter is driven by the electronic module and the transmitter is configured to communicate data associated with the predetermined set of parameters. A receiver is in communication with the transmitter and the receiver is configured to obtain the communicated data.

In still another aspect of the invention an electronic module configured to record and transmit data associated with a circuit breaker is provided comprising a processor disposed on the electronic module. Memory is disposed on the electronic module, and the memory is configured to store the data. A transmitter is in communication with the processor and the transmitter is configured to transmit data stored in the memory.

These and other features, aspects and advantages of the present invention will become better understood with reference to the following drawings, description, and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The circuit breaker system described herein is suitable for use for the protection of electrical circuits or components. More specifically, the circuit breaker system lends itself particularly well to the protection of safety critical circuits and components such as those typically found in aircraft or the like or other high reliability electrical systems. In addition, the system is well suited for the protection of complex circuits where it may be desirable to determine why a particular circuit was tripped.

The circuit breaker system described herein provides a novel means to determine the reason for a fault that caused a circuit to overload or otherwise trip open. In addition, the "smart" circuit breaker system described herein provides for quick and precise diagnostics that will reduce repair time and enhance overall system operating efficiency. For example, unlike the prior art, the circuit breaker system described herein allows a hand held (or portable) communication device that communicates with the smart circuit breaker to obtain data associated with a tripped circuit. The smart circuit breaker houses a means for recording and storing various parameters associated with the circuit in question and on demand, this data may be downloaded to the hand held (or portable) communication device.

Figure 1:
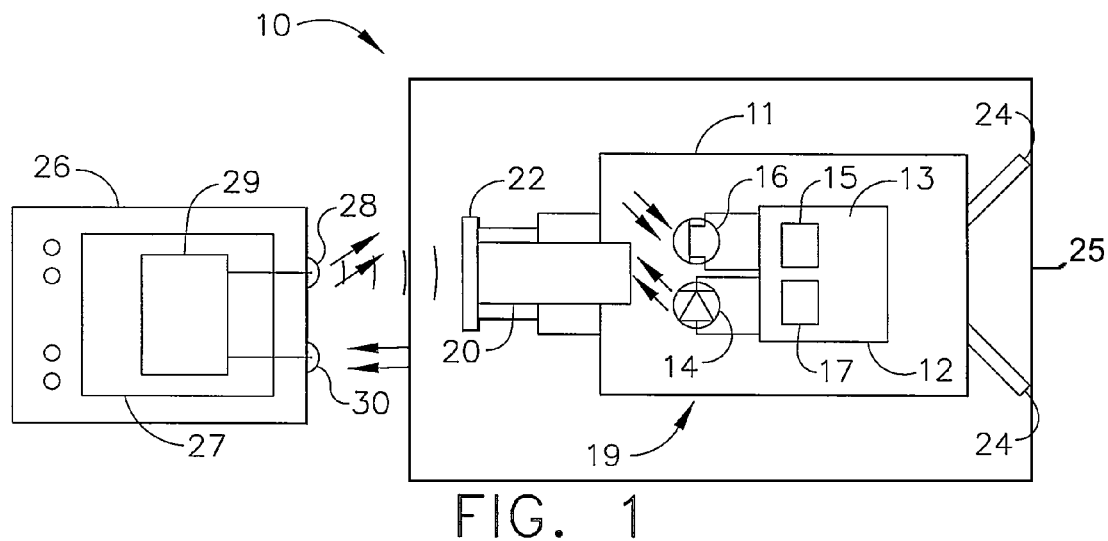
FIG. 1 is a simplified side plan view of the circuit breaker system according to one embodiment.
Figure 2:
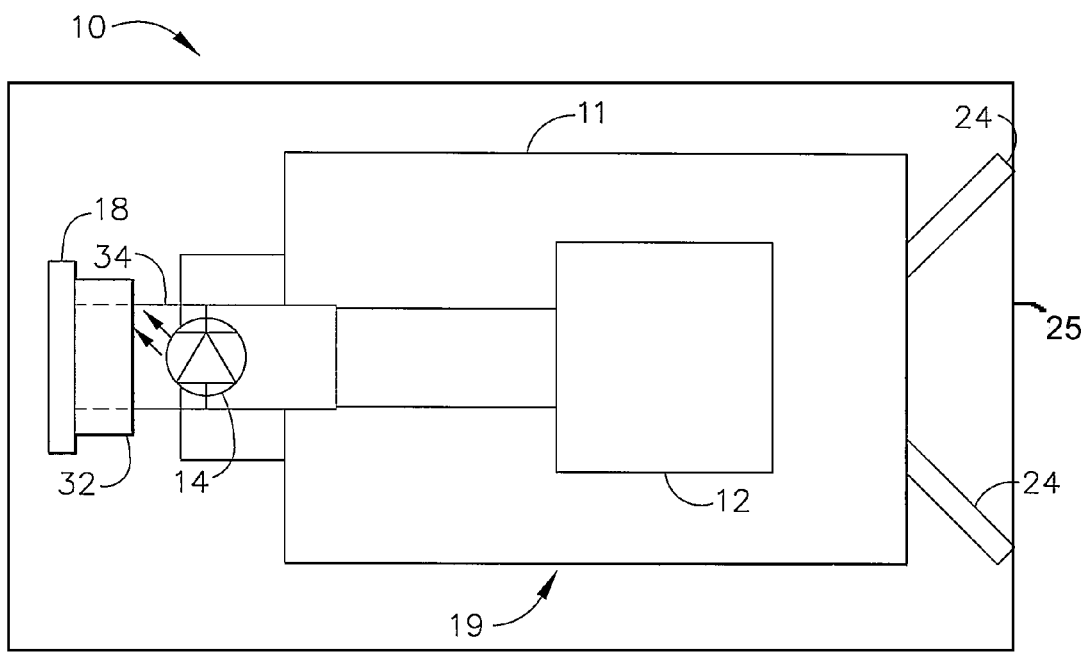
FIG. 2 is a simplified side plan view of an alternate circuit breaker system according to one embodiment.

Referring now to FIGS. 1 and 2 which show a circuit breaker system 10 in accordance with the invention, the circuit breaker system 10 may be comprised of a housing 11 which contains an electronic module 12 therein. The housing 11 may be comprised of any well known typical circuit breaker housing which is configured to contain the various components of a typical circuit breaker. In communication with the electronic module 12 may be a first transmitter 14 and a first receiver 16. The electronic module 12 may be comprised of a processor 15 and memory 17. The processor 15 and memory 17 may be configured to record and store various parameters associated with the circuit breaker 19.

As shown in the figures, first transmitter 14 may be an LED or other optical signaling device and the first receiver 16 may be a photo receptor of any well known configuration. A button 18 may be movably affixed to the housing 11 and may be configured to move in relation to the opening and closing of the electrical circuit of the circuit breaker 19. As is well known in the circuit breaker art, when a fault occurs which causes an overload condition, the circuit breaker 19 will trip and cut power to that particular circuit being protected. The button 18 may provide a visual indication of the status of the circuit breaker 19 and may allow the circuit breaker 19 to be reset to the closed position. A pair of contacts 24 may extend from the housing 11 and may be configured to attach the circuit breaker 19 in a circuit breaker panel 25 in any well known manner.

A transparent window 22 may be disposed on the button 18 such that a communicator 26 can transmit to and receive data from the circuit breaker 19. The transparent window 22 may be in the form of a lens to enhance signal isolation between the circuit breaker and the hand held device 26. The communicator 26 may be a hand held computing device such as a Personal Digital Assistant equipped with specialized software or a dedicated device specifically adapted for use in the circuit breaker system 10. Disposed on the communicator 26 may be a second transmitter 28 and a second receiver 30. Processor board 29 may be in communication with and control the operation of the second transmitter 28 and second receiver 30. Second transmitter 28 may be configured to transmit signals to first receiver 16 and first transmitter 14 may be configured to transmit signals to second receiver 30. A display 27 may be provided on the communicator 26 to display the data associated with the circuit breaker 19 in question. Wave conduit 20 may comprise a fiber optic material and may be provided to further enhance the communication between the circuit breaker 19 and the communicator 26.

Referring specifically to FIG. 2, an alternate configuration of the circuit breaker system 10 is shown which includes an opaque sleeve 32 slidably mounted on a transparent area 34 of button 18 which allows the opaque sleeve 32 to be selectably positioned to allow communication between the circuit breaker 19 and the communicator 26. In this configuration, the window 22 is omitted and communication between the circuit breaker 19 and the communicator 26 occurs through the transparent area 34.

The electronic module 12 may be configured to monitor various parameters associated with the circuit being protected. In the event the circuit breaker 19 is tripped, the parameters associated with the circuit may be retained in memory. The electronic module 12 may be further configured to operate the first transmitter 14 and first receiver 16 to relay the collected data to the communicator 26.

It may be possible to provide a circuit breaker system 10 that continuously transmits data which may be received by the communicator 26. In this configuration, the electronic module 12 may not need a first receiver 16 and the communicator 26 may not need a second transmitter 28.

It should be mentioned that the transmitters and receivers described herein may comprise a typical infrared or visible-light LED pair, or may be a speaker and microphone for acoustically coupled applications, or even a pair of antennas attached to radio devices, or a pair of electrical contacts.

A wireless communication system 10 has been disclosed that may allow a service technician to obtain various data concerning the tripping of a circuit breaker 19 which may enhance the technician's ability to determine the fault and more rapidly address the problem associated with the circuit in question. In addition, this additional information may be provided to the technician without altering the look or operation of existing circuit breaker designs and requires no additional training for use by pilots or other passengers of the aircraft in the event of a tripped circuit breaker.

It is also contemplated that an embodiment of the invention may use radio wave technology to communicate data between the circuit breaker 19 and the communicator 26. This may allow for communication with the circuit breaker 19 without the need for gaining access to the circuit breaker panel 25 and may also allow for more rapid collection of data, especially in the case of multiple circuit breakers 19 that have tripped.

Figure 3:
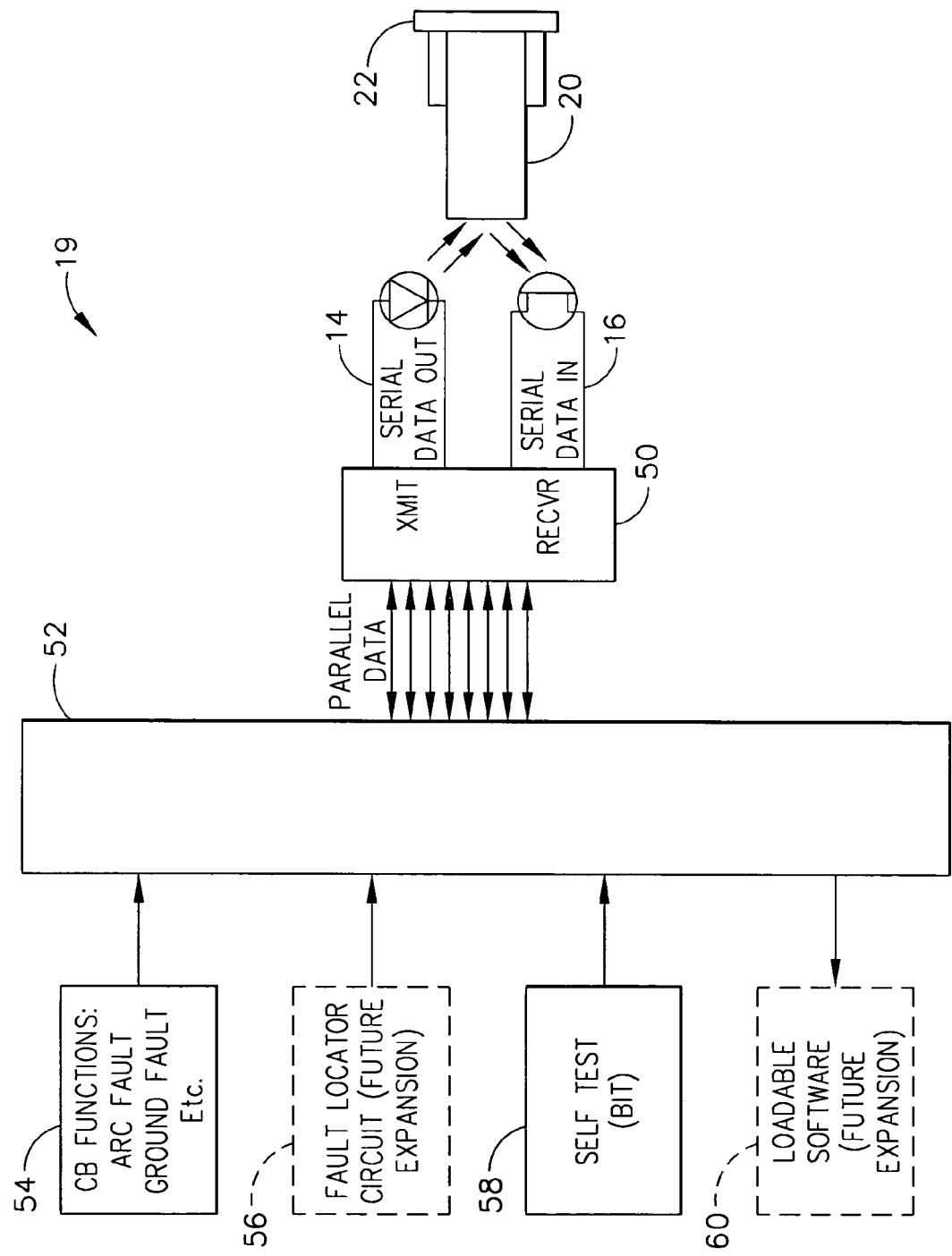
FIG. 3 is a block diagram of the circuit breaker communication system according to one embodiment.

Referring now to FIG. 3, a smart circuit breaker 19 is shown in more detail. As previously discussed, the first transmitter 14 and first receiver 16 are provided in the circuit breaker 19, both of which are in communication with a processor 52 through a universal asynchronous receiver/transmitter (UART) 50. The UART 50 is only required if the processor or micro-controller 52 does not have a serial port already built in. Data is transmitted to and from the processor 52 by the first transmitter 14 and the first receiver 16. In communication with the processor 52 are various functions that may be provided as part of the circuit breaker communication system 10. This may include for example a fault type detection function 54 which may be configured to determine what caused a circuit breaker 19 to be tripped. A fault location feature 56 may also be provided which will determine the exact device/location on the circuit which caused the circuit breaker 19 to trip. It may also be desirable to provide a built in test (BIT) feature 58 as part of the circuit breaker 19. This feature may allow the circuit breaker 19 to run a diagnostic test on itself to insure the circuit breaker 19 is functioning properly. It may also be desirable to provide a feature that would allow for the uploading of software to the circuit breaker 19 as shown in block 60. This may allow the function of the circuit breaker 19 to be upgraded as new software modules are developed.

Figure 4:
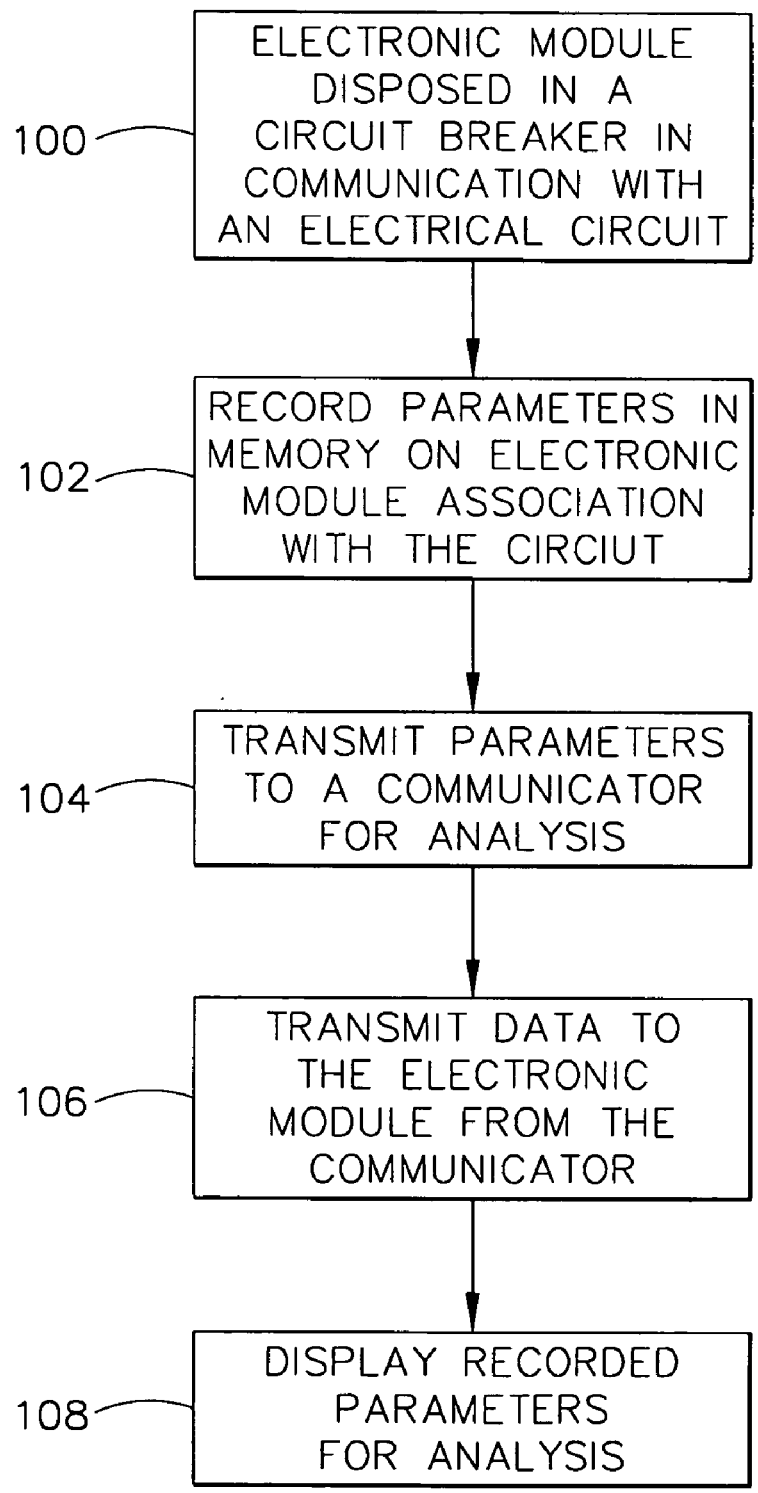
FIG. 4 is a flow diagram depicting the steps associated with the circuit breaker communication system according to one embodiment.

Referring now to FIG. 4, a block diagram depicting the function of the circuit breaker system 10 is shown. An electronic module 12 is provided in a circuit breaker 19 at block 100. As previously discussed, the electronic module 12 is in communication with an electrical circuit 21. Various parameters such as voltage, current, fault type, etc. associated with the electrical circuit are recorded to memory 17 at block 102. At block 104, the recorded parameters are transmitted to the communicator 26. At block 106, the communicator 26 may transmit data to the electronic module 12 to control the flow of data from the electronic module 12. Finally, at block 108, the record parameters are displayed on display 27 for analysis by the user.

It should be understood, of course, that the foregoing relates to preferred embodiments of the invention and that modifications may be made without departing from the spirit and scope of the invention as set forth in the following claims.

I claim:

1. A circuit breaker communication system comprising:
   a circuit breaker comprising a button configured to move in response to, and provide a visual indication of, operating status of said circuit breaker, and comprising a window disposed on said button;
   a communicator configured to transmit to or receive signals from said circuit breaker through said window;
   an electronic module associated with said circuit breaker;
   a processor board coupled to the electronic module and configured to record and store data associated with operation of said circuit breaker;
   a fault type detection module coupled to said processor board, wherein the fault type detection module is configured to determine a cause of a passive trip in said circuit breaker;
   a fault location detection module coupled to said processor board, wherein the fault location detection module is configured to determine a device/location on a circuit which caused said passive trip in said circuit breaker;
   a transmitter in communication with said electronic module, wherein said transmitter is configured to transmit said data to said communicator through said window; and
   a receiver in communication with said electronic module, wherein said receiver is configured to receive said signals from said communicator through said window.

2. The circuit breaker communication system of claim 1 wherein said transmitter is one selected from the group consisting of an infrared LED, a visible light LED, a speaker, an antenna, and two wire conductor interface.

3. The circuit breaker communication system of claim 1 wherein said receiver is one selected from the group consisting of an infrared LED, a visible light LED, a microphone, an antenna, and two wire conductor interface.

4. The circuit breaker communication system of claim 1 wherein said communicator is a Personal Digital Assistant.

5. The circuit breaker communication system of claim 1 further comprising a wave conduit in alignment with said transmitter and said receiver, said wave conduit configured to aid the transmission of data between the circuit breaker and said communicator.

6. The circuit breaker communication system of claim 5 further comprising an opaque sleeve slidably disposed on said wave conduit, said opaque sleeve configured to be selectably positioned to allow communication with said circuit breaker.

7. The circuit breaker communication system of claim 1 wherein said communicator further comprises:
   a second receiver configured to receive signals from said transmitter; and,
   a second transmitter configured to transmit signals to said receiver.

8. A circuit breaker for an aircraft, configured to record and transmit various parameters associated with an electrical circuit, the circuit breaker comprising:
   a circuit breaker housing configured for insertion into a circuit breaker panel of the aircraft;
   a button movably affixed to said circuit breaker housing, and configured to move in response to, and provide a visual indication of, operating status of said circuit breaker; an optically transparent window disposed on said button;
   an electronic module associated with said circuit breaker housing, wherein said electronic module is configured to record a predetermined set of parameters associated with the electrical circuit to obtain recorded operational parameters;
   a fault type detection module coupled to said electronic module, wherein the fault type detection module is configured to determine a cause of a passive trip in said circuit breaker based on said recorded operational parameters;
   a fault location detection module coupled to said electronic module, wherein the fault location detection module is configured to determine a device/location on a circuit which caused said passive trip in said circuit breaker based on said recorded operational parameters;
   a transmitter in communication with said electronic module, wherein said transmitter is configured to transmit, through said window, data associated with said recorded operational parameters; and
   a fiber optic wave conduit in alignment with said transmitter, said wave conduit configured to aid the transmission of data between the circuit breaker and a communicator.

9. The circuit breaker of claim 8 further comprising a receiver configured to receive, through said window, data from a hand held communicator.

10. The circuit breaker of claim 9 wherein said communicator is a hand held computing device.

11. The circuit breaker communication system of claim 8 further comprising an opaque sleeve slidably disposed on said fiber optic wave conduit, said opaque sleeve configured to be selectably positioned to allow communication with said transmitter.

12. A circuit breaker communication device for an aircraft, the circuit breaker communication device being disposed in a circuit breaker and configured to receive data from the circuit breaker, the circuit breaker communication device comprising:
   a housing;
   a button movably affixed to said housing, and configured to move in response to, and provide a visual indication of, operating status of the circuit breaker;

an optical window disposed on said button;
a processor board disposed in said housing;
a fault type detection module coupled to said processor board, wherein the fault type detection module is configured to determine a cause of a passive trip in said circuit breaker;
a fault location detection module coupled to said processor board, wherein the fault location detection module is configured to determine a device/location on a circuit which caused said passive trip in said circuit breaker;
a receiver in communication with said processor board, wherein said receiver is configured to receive data through said window, and to communicate with the circuit breaker; and
a transmitter in communication with said processor board, wherein said transmitter is configured to transmit data through said window.

13. The circuit breaker communication device of claim 12 wherein said processor board communicates with the circuit breaker via one selected from the group consisting of an infrared LED, a visible light LED, a speaker, an antenna, and a two wire conductor interface.

14. The circuit breaker communication device of claim 12 wherein said processor board is configured to record data associated with the circuit breaker.

15. The circuit breaker communication device of claim 12 wherein said processor board is configured to display data associated with the circuit breaker.

16. A system for wireless communication with a circuit breaker for an aircraft, said system comprising:

a housing configured for installation into a circuit breaker panel of the aircraft;
a button movably affixed to said housing, and configured to move in response to, and provide a visual indication of, operating status of the circuit breaker;
an optical window disposed on said button;
an electronic module disposed in said housing, wherein said electronic module is configured to measure and record a predetermined set of parameters associated with an electrical circuit to obtain recorded operational parameters;
a fault type detection module coupled to said electronic module, wherein the fault type detection module is configured to determine a cause of a passive trip in said circuit breaker based on said recorded operational parameters;
a fault location detection module coupled to said electronic module, wherein the fault location detection module is configured to determine a device/location on a circuit which caused said passive trip in said circuit breaker based on said recorded operational parameters;
a transmitter driven by said electronic module, wherein said transmitter is configured to communicate, through said window, data associated with said predetermined set of parameters; and
a receiver in communication with said transmitter, wherein said receiver is configured to obtain, through said window, said communicated data.

* * * * *